Nov. 28, 1950 M. H. JOHNSON ET AL 2,531,437

WAVE GUIDE IMPEDANCE TRANSFORMER

Original Filed March 31, 1942

INVENTORS
MONTGOMERY H. JOHNSON
WILLIAM W. HANSEN
BY Paul B. Hunter
ATTORNEY

Patented Nov. 28, 1950

2,531,437

UNITED STATES PATENT OFFICE 2,531,437

WAVE GUIDE IMPEDANCE TRANSFORMER

Montgomery H. Johnson, Boston, Mass., and William W. Hansen, Garden City, N. Y., assignors to The Sperry Corporation, a corporation of Delaware Original application March 31, 1942, Serial No. 437,004. Divided and this application May 5, 1945, Serial No. 592,092

5 Claims. (Cl. 178—44)

The present invention relates to the art including impedance matching and transforming devices especially adapted for use in systems utilizing high frequency electromagnetic energy conducted in wave guides.

The present application constitutes a division of prior copending application Serial No. 437,004, filed March 31, 1942, which became an issued Patent No. 2,433,368 on December 30, 1947, for Wave Guide Construction.

In transferring energy from one high frequency device to another, it is well known that the impedances thereof must be properly matched in order to avoid the production of standing waves, with their attendant increase in losses and decrease in the energy transmitting capacity of the system. In addition, for greater efficiency of power transfer, it is known that the impedance of a load device must be properly matched to that of the high frequency source.

The present invention is directed toward the provision of improved impedance transforming devices which are adapted to transform an impedance connected at one end to a different value at the other end of such a transforming device, whereby this transformed impedance may be matched to a load or other impedance connected at such other end.

Accordingly, it is an object of the present invention to provide improved impedance transformers for transforming a given impedance into a desired impedance.

It is another object of the present invention to provide relatively simple fixed impedance transformers suitable for use in electromagnetic wave guides.

Another object of the present invention is to provide an improved adjustable impedance transformer for use in the system having a maximum ease of adjustment and range of impedance transformation.

It is still another object of the present invention to provide an improved impedance transformer which is relatively insensitive to the changes in operating frequency.

Still another object of the present invention is to provide further wave guide impedance transformers which are substantially independent of frequency over a considerable range of operation.

Other objects and advantages will become apparent from the following specification and drawings, in which.

The present invention is useful especially in the connection between a high frequency source and a radiating wave guide, such as shown in said application Serial No. 437,004, which became an issued Patent No. 2,433,368 on December 30, 1947. Such radiating wave guides in general require impedance matching devices to match them to the wave guides through which the input energy flows. Such devices form the present invention.

Figure 1:
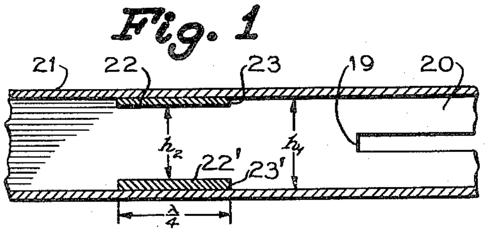
Fig. 1 shows a longitudinal cross-sectional view of a wave guide incorporating an impedance transformer according to the present invention.

Fig. 1 shows a rectangular radiating wave guide 20 in cross-section, whose radiating slot begins at the point 19 and which is attached to a rectangular wave guide 21 whose cross-section is equal to that of the radiating guide. Preferably equal height conducting plugs 22, 22' are attached to opposite surfaces of the wave guide 20 perpendicular to the side containing the slot. The distance between these wave guide surfaces is $h_1$ while the distance between the opposed faces of the plugs 22 and 22' is $h_2$. The length of the plugs 22, 22' is approximately a quarter wavelength of the operating frequency or an odd multiple thereof, as measured in the guide 20. The proper position of the plugs 22, 22' along the longitudinal axis of guide 21 may be determined by measuring the standing wave ratio V max/V min in the guide 21 as a function of distance along this guide. Here V max/V min is the ratio of the magnitude of the voltage antinodes to the voltage nodes in the guide 21 before the plugs are in place. The plugs 22, 22' are then inserted and fastened so that one edge of the plugs, at 23, 23', is at a voltage nodal point for the standing wave found in the guide. The thickness of the plugs is determined by the standing wave ratio V max/V min and the width $h_1$ of the guide, as expressed by the relation:

$$\frac{V\ \max}{V\ \min}=\frac{h_1}{h_2} \qquad (1)$$

The point 23 is preferably the first minimum in the standing wave found in the non-radiating guide 21 adjacent to the slot end 19. A single plug 22 may be used if the standing wave ratio is nearly unity, as the wave traveling through the guide is less distorted by a small unsymmetrical disturbance than by a large one.

Figure 2:
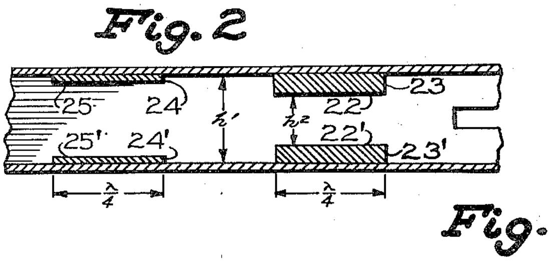
Figs. 2 and 3 show corresponding longitudinal cross-sectional views of modified forms of a fixed impedance transformer.

If one such trial at reduction of the standing wave due to impedance mismatch is insufficient, the procedure may be repeated as shown in Fig. 2, a new nodal point 24, 24′ being found to determine the position of smaller plugs 25, 25′, the plugs 25, 25′ also being approximately a quarter-wave long in the guide 21.

Figure 3:
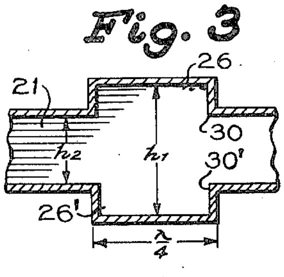

The matching sections need not be reentrant, as in Figs. 1 and 2, but may enlarge the guide in one or two oppositely spaced enlargements, as at 26, 26′ in Fig. 3. If the larger dimension is still defined as $h_1$, it will here refer to the width of the enlarged portion 26, 26′ while the smaller distance $h_2$ will refer to the width of the guide 21 itself. With these definitions, the size of the enlarged portion 26, 26′ is again determined by Equation 1. The edges 30, 30′ are now placed at the voltage anti-node nearest the slot, each enlargement 26, 26′ being approximately a quarter-wave long in the guide 21. This type of transformer may be preferred to the reentrant type, as it avoids high electric fields and lessens the likelihood of arc-overs at high power levels.

Figure 4:
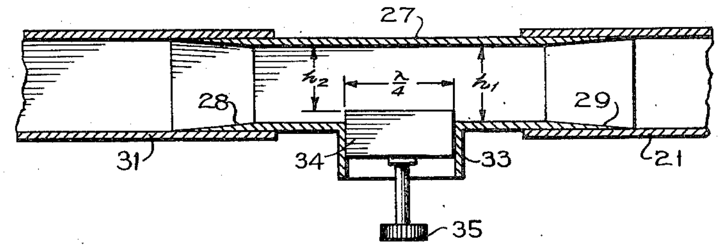
Fig. 4 shows a longitudinal cross-sectional view of an adjustable wave guide impedance transformer.

The devices of Figs. 1 and 3 may be made adjustable in the manner shown in Fig. 4. A slidable guide 27 with ends preferably tapered over a distance large relative to one-half-wavelength in the guide 21, as at 28, 29 (shown foreshortened here for convenience of illustration) is mounted to slide in the end of the excited wave guide 31 and the non-radiating guide 21 feeding directly into the radiating guide 20 or any other device, as desired. Projecting preferably at right angles to guide 27 and mounted thereon is a rectangular tube 33 in which a conducting rectangular short-circuiting piston 34 may be positioned by means of knob 35. Piston 34 is substantially a quarter-wavelength long as measured in the guide 21 or 31 in the direction of energy flow, and is substantially as deep as guide 27. The procedure in adjusting the transformer may be similar to that for adjusting or selecting the location of the transformer of Fig. 1, 2 or 3. If desired, two plugs similar to 34 but at opposite sides of section 27 may be used, to more closely aproach the type of transformer shown in Figs. 1 and 3.

Figures 5, 6, 7, 8, 9, 10, 11, 12:
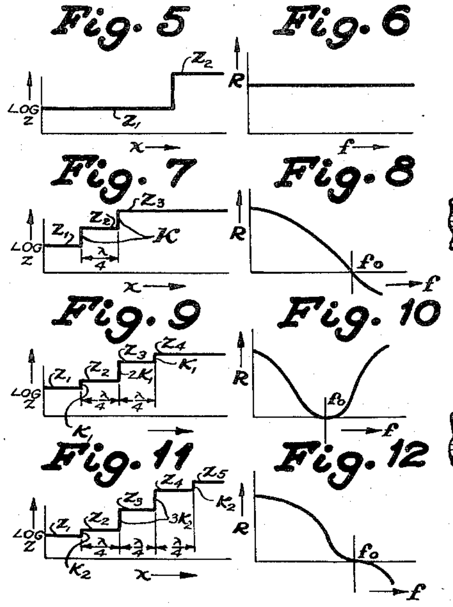
Figs. 5, 6, 7, 8, 9, 10, 11 and 12 are explanatory graphs useful in explaining the theory of the frequency-insensitive impedance transformers of Figs. 13 and 14.

The impedance matching transformers so far described may be found to be somewhat critical with respect to frequency variations at the high operating frequency normally utilized. It may be desirable to provide such devices having broader frequency characteristics for use with apparatus in which perfect frequency stabilization is not obtainable. Consider a joint between wave guides of characteristic impedances $Z_1$ and $Z_2$. If the impedance discontinuity is made abruptly by joining the two wave guides directly together, as is shown in the graph of Fig. 5, the reflection coefficient R characteristic of the joint is a constant as a function of frequency, as is shown in the graph of Fig. 6. This reflection coefficient R is defined as the ratio of the amplitude of the reflected wave to that of the forward-travelling wave in the wave guide. For optimum operation R should be zero, since then no standing waves are produced. In the case of Fig. 5, absence of standing waves cannot be produced.

It has been found that if the discontinuity in impedance between two such guides is divided between two joints spaced a quarter-wavelength apart, in such a manner that the increments in the logarithm of the characteristic impedances of the sections of wave guide at the joints are equal, as shown in Fig. 7, the reflection coefficient for such an impedance discontinuity will have the frequency characteristic shown in the graph of Fig. 8, crossing the axis where R=0 at one particular frequency $f_0$.

It is further found that if three discontinuities, each a quarter-wave apart, are provided to join two wave guides of differing characteristic impedances, $Z_1$ and $Z_4$, and if the changes in the logarithm of the characteristic impedances of the wave guide sections at each joint are defined by the relations:

$$\left.\begin{aligned}\log Z_2-\log Z_1&=k_1\\ \log Z_3-\log Z_2&=2k_1\\ \log Z_4-\log Z_3&=k_1\end{aligned}\right\}\qquad(2)$$

where $k_1$ is a constant, as shown in the graph of Fig. 9, the reflection coefficient R as a function of frequency is of the form shown in Fig. 10, and has less frequency sensitivity at the frequency $f_0$ because R is substantially zero over a limited range of frequencies.

If four discontinuities in the logarithm of the impedances are defined by three quarter-wave guide sections joining the two terminal impedances or wave guides of characteristic impedance $Z_1$ and $Z_5$, as in the graph of Fig. 11, the reflection coefficient characteristic is of the form of the graph of Fig. 12, if the increments in the logarithms of the successive sections are described by the relations:

$$\left.\begin{aligned}\log Z_2-\log Z_1&=k_2\\ \log Z_3-\log Z_2&=3k_2\\ \log Z_4-\log Z_3&=3k_2\\ \log Z_5-\log Z_4&=k_2\end{aligned}\right\}\qquad(3)$$

where $k_2$ is a constant. It is seen that a transformer having a reflection coefficient characteristic of the form of Fig. 10 has a fairly broad and useful frequency range, and that a transformer with a reflection coefficient similar to Fig. 12 has an even broader frequency band in which substantially perfect impedance matching can be obtained.

In fact, it is found that if the coefficients of $(x+1)^n$ are used to describe the increments in the logarithm of the characteristic impedance of successive quarter-wavelength sections of wave guide making up an impedance matching transformer between two wave guides of arbitrary characteristic impedances, the useful frequency range of such a transformer is increased as $n$ is increased.

Figure 13:
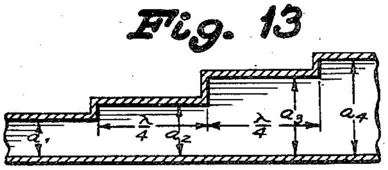
Fig. 13 shows a longitudinal cross-sectional view of one form of such frequency-insensitive impedance transformer.
Figure 14:
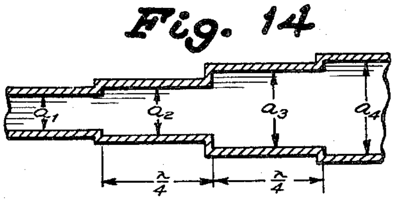
Fig. 14 shows a longitudinal cross-sectional view of a modification of the device of Fig. 13.

Figs. 13 and 14 illustrate, in longitudinal cross-section, two forms of rectangular wave guides in which the relations of Equation 2 are utilized. However, it is to be noted that the guide may be of any cross-section, and the geometrical alterations in the guide used to provide the logarithmic increments discussed above may be made in the guide in any manner, although they are preferably made in a manner which does not alter the phase velocity of the wave traveling through the transformer, where the term "phase velocity" as used here is to be understood as meaning the ratio of the circular frequency of the exciting wave to the propagation constant of the waves within the wave guide.

In general, in the cases shown in Figs. 1-14, if the guide is rectangular, the alterations are made in sides of the guide perpendicular to the electric field therein; that is, the electric field lines in the figure run in a vertical direction parallel to the plane of the drawing so that there is no change in the phase velocity of the wave in the transformer. In this case, the ratio of the characteristic impedances of any two sections is equal to the ratio of their dimensions parallel to the electric field within these two sections.

Accordingly, the necessary condition for frequency intensitivity is that, for the case of Figs. 9 and 10.

$$\left.\begin{array}{l}\log a_1-\log a_2=k\\ \log a_2-\log a_3=2k\\ \log a_3-\log a_4=k\end{array}\right\}\quad(4)$$

where $a_1$, $a_2$, $a_3$ and $a_4$ are the successive widths of the wave guide sections, the depth being constant, and $k$ is a constant. Expressing this condition in another manner, $$\left.\begin{array}{l}\frac{a_1}{a_2}=k\\ \frac{a_2}{a_3}=k^2\\ \frac{a_3}{a_4}=k\end{array}\right\}\quad(5)$$

For increased frequency insensitivity, more quarter-wave sections are used, and similar equations are derived, the coefficients of the right members of the equations corresponding to (4), or the exponents of the right members of the equations corresponding to (5), being related as the binomial coefficients, which are the coefficients of the successive terms of the expansion of $(x+1)^n$, where $n$ is the number of sections used.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An impedance matching wave guide section, comprising a portion of rectangular wave guide having a plurality of successive sections of different inside dimensions in the form of steps such that the change in the logarithm of the impedance at each successive step is proportional to the corresponding binomial coefficient resulting from a binomial expansion of order one less than the number of steps.

2. A frequency insensitive wave guide impedance transformer adapted to interconnect two wave guides of differing dimensions, comprising a plurality of sections of wave guide interposed between said two guides, each of said sections being substantially a quarter wavelength long at the operating frequency of said device, and said sections each having a corresponding internal dimension of different length with respect to the corresponding dimensions of said two wave guides and with respect to each other, the change in the logarithm of the impedance at each successive discontinuity defined by said different dimensions being proportionally related in accordance with the binomial coefficients resulting from a binomial expansion of order equal to the number of said sections.

3. A frequency insensitive impedance transformer adapted to join a pair of rectangular wave guides of different dimensions comprising a plurality of rectangular wave guide sections having different inside dimensions, each of said sections being substantially one quarter wavelength long at the operating frequency of said device, and the ratios of the dimensions parallel to the direction of the electric field vector of successive wave guides and wave guide sections being related in accordance with the binomial coefficients resulting from a binomial expansion of order equal to the number of said sections.

4. A frequency insensitive impedance transformer adapted to join a first rectangular wave guide to a second rectangular wave guide having a different characteristic impedance comprising a first rectangular wave guide section, a second rectangular wave guide section whose length is equal to said first section, said first section being connected between said first rectangular wave guide and said second section, said second wave guide being connected to the free end of said second rectangular wave guide section, the logarithm of the ratio of the impedance of said first rectangular wave guide section to the impedance of said first rectangular wave guide being equal to the logarithm of the ratio of the impedance of said second rectangular wave guide to the impedance of said second rectangular wave guide section and also being equal to one half the logarithm of the ratio of the impedance of said second rectangular wave guide section to the impedance of said first rectangular wave guide section.

5. A frequency-insensitive impedance transformer for joining a pair of rectangular wave guides having different characteristic impedances, comprising a plurality of cascaded rectangular wave guide sections adapted to transmit electromagnetic wave energy and each having a cross-sectional dimension parallel to the electric field vector therein of different lengths, the length of the cross-sectional dimension of a first of said plurality of cascaded wave guide sections parallel to the electric field vector therein being different from the corresponding cross-sectional dimension of the first of said pair of wave guides to form a step therewith, and the length of the cross-sectional dimension of the last of said plurality of cascaded wave guide sections parallel to the electric field vector therein being different from the corresponding cross-sectional dimension of the other of said pair of wave guides to form a step therewith, said different cross-sectional dimensions forming successive steps such that the change in the logarithm of the impedance at each successive step is proportional to the corresponding binomial coefficient resulting from a binomial expansion of the order of one less than the number of steps.

MONTGOMERY H. JOHNSON.
WILLIAM W. HANSEN.

REFERENCES CITED

The following references are of record in the file of this patent:

UNITED STATES PATENTS

| Number | Name | Date |
|---|---|---|
| 2,106,768 | Southworth | Feb. 1, 1938 |
| 2,106,769 | Southworth | Feb. 1, 1938 |
| 2,129,669 | Bowen | Sept. 13, 1938 |
| 2,273,465 | Carter | Feb. 17, 1942 |
| 2,407,911 | Tonks | Sept. 17, 1946 |
| 2,416,698 | King | Mar. 4, 1947 |